United States Patent Office 3,003,992
Patented Oct. 10, 1961

3,003,992
GLYCIDYL ESTER COPOLYMER-CARBOXY SUBSTITUTED SILICONE COMPOSITION AND METALLIC ARTICLE COATED WITH SAME
David W. Mabrey, Middletown, Ky., and Robert A. Baugh, Milwaukee, Wis., assignors to Devoe & Raynolds Company, Inc., Louisville, Ky., a corporation of New York
No Drawing. Filed Dec. 6, 1957, Ser. No. 700,945
7 Claims. (Cl. 260—45.4)

This invention relates to resinous compositions containing organosilicon compounds. By organosilicon compound is intended that class of compounds known in the industry as silicones, and which includes silanes, silanols, siloxanes and siloxanols.

The resinous compositions of this invention are characterized by outstanding chemical resistance. In addition, the resinous compositions of the invention are especially suitable for use in the production of pigmented finishes. Pigmented coating compositions have especially good color and gloss, and particularly good gloss and color retention on overbake, rendering them eminently suitable for use on refrigerators, ranges, washing machines and other home appliances. Pigmented coating compositions prepared by the teachings of the invention are also characterized by excellent resistance to ultraviolet rays and good stain resistance.

In accordance with this invention a novel composition of matter is provided which includes resinous compositions and their cross-linked products resulting from the combination of a glycidyl ester copolymer and a carboxy-containing organosilicon compound. The invention more specifically includes an epoxy-containing copolymer derived from a copolymerizable glycidyl ester of an alpha-beta unsaturated monocarboxylic acid of not more than four carbon atoms and a copolymerizable vinylidene compound, in combination with a carboxy-containing compound derived from an organosilicon compound of the general formula

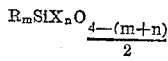

where R is an alkyl radical of not more than ten carbon atoms and/or a phenyl radical; X is selected from an alkoxy radical, a halogen or OH; $m$ has an average value of one to two; $n$ has an average value of 0.01 to 3; and the sum of $(m+n)$ is not greater than four.

The epoxy-containing copolymer is prepared by copolymerizing a vinylidene compound and the glycidyl ester of an alpha-beta unsaturated monocarboxylic acid. Valuable alpha-beta unsaturated monocarboxylic acids for use in the preparation of this copolymer are aliphatic monobasic acids such as acrylic, methacrylic and crotonic, in other words, alpha-beta unsaturated monocarboxylic acids of not more than four carbon atoms, the glycidyl ester being represented by the general formula:

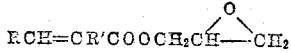

where R and R' each represents a member of the class of hydrogen and methyl radicals.

In the preparation of the epoxy-containing copolymer, glycidyl methacrylate, or acrylate, etc., as the case may be, is polymerized with a vinylidene compound in accordance with well known polymerization methods. However, in many instances, it is desirable to use two vinylidene compounds with the ester to form a three component polymer or terpolymer, the polymerization being effected, for example, through the use of a peroxide or hydroperoxide catalyst and a temperature in the range of 15° C. to 140° C. to form the polymer. Suitable copolymers generally contain from two to fifty percent glycidyl methacrylate or the like and have weights per epoxide of 280 to 7100. A particularly desirable heteropolymer is one containing sixty percent styrene, thirty percent methyl methacrylate, and ten percent glycidyl methacrylate. As indicated other desirable polymers contain from two to fifty percent glycidyl methacrylate in admixture with styrene and/or methyl methacrylate in such proportions that the total is one hundred percent.

Unsaturated monomers which can be copolymerized with glycidyl esters to form the epoxy-containing copolymers are vinyl, vinylidene or vinylene compounds. Glycidyl ester copolymers are well known, the other unsaturated monomers used in them being unsaturated hydrocarbons, esters of saturated alcohols and unsaturated acids, esters of unsaturated alcohols and saturated acids, as well as unsaturated halogen and nitrogen-containing compounds each having a single double bond. Examples are allyl, methallyl, crotyl, 1-chloroallyl, 2-chloroallyl, cinamyl, vinyl, methvinyl, 1-phenylallyl, butenyl, etc. alcohol esters of saturated aliphatic and aromatic monobasic acids such, for example, as acetic, propionic, butyric, valeric, caproic, benzoic, phenylacetic, etc. acids. Included also are the saturated monohydric alcohol esters, e.g., the methyl, ethyl, propyl, isopropyl, butyl, sec-butyl, amyl, etc. esters of unsaturated aliphatic monobasic and polybasic acids, such as acrylic and alpha-substituted acrylic (including alkacrylic, e.g., methacrylic, ethacrylic, propacrylic, etc., and arylacrylic, e.g., phenylacrylic, etc.), crotonic, maleic, fumaric, citraconic, mesaconic, itaconic, aconitic, etc. Other unsaturated monomers are vinyl cyclic compounds (including monovinyl aromatic hydrocarbons), e.g., styrene ortho-, meta- and para-chloro styrenes, bromo styrenes, fluoro styrenes, methyl styrenes, ethyl styrenes, cyano styrenes, the various poly-substituted styrenes such, for example, as the various di-, tri- and tetra-chloro styrenes, bromo styrenes, fluoro styrenes, methyl styrenes, ethyl styrenes, cyano styrenes, etc., vinyl naphthalene, vinylcyclohexane, vinyl furane, vinyl pyridine, vinyldibenzofuran, allyl benzene, N-vinyl carbazole, the various allyl cyano styrenes, the various alpha-substituted styrenes and alpha-substituted ring-substituted styrenes, e.g., alpha-methyl styrene, alpha-methyl para-methyl styrene, etc.; unsaturated ethers, e.g., ethyl vinyl ether, ethyl allyl ether, ethyl methallyl ether, etc.; unsaturated amides, for instance, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, and the like.

The carboxy-containing organosilicon compound is prepared by reacting the organosilicon compound of the formula

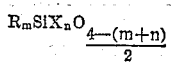

a glycol, a dibasic acid, preferably the dibasic acid anhydride. The glycol reacts with the organosilicon compound to form a polyhydroxy derivative which in turn reacts with the anhydride to form a carboxy-containing organosilicon compound. In some instances, it is desirable to first react the glycol and the organosilicon compound to form the hydroxy intermediate. The hydroxy intermediate subsequently is reacted with the dibasic acid anhydride. However, it is understood that the hydroxy ester, or polyester, of the dibasic acid can be first formed and the hydroxy esters subsequently reacted with the organosilicon compound. The organosilicon compound preferably should have a functionality of at least two, and at least two mols of glycol are employed per mol of organosilicon compound, the number of mols of glycol not exceeding the functionality of the organosilicon compound. Since the organosilicon compound is not unsaturated, by functionality is meant the number of reactive groups in the organosilicon molecule such as hydroxyl, halo, alkoxy groups and the like. Referring to the dibasic acid anhydride, or acid, it would appear that at least two mols of this reactant are required for cross-linked compositions. Nevertheless, it has been found that one mol of acid or anhydride initiates the reaction and because of accompanying epoxy-hydroxy reactions, suitable cross-linked compositions are obtained. Normally, however, at least two mols of the acid or anhydride are employed, the number not exceeding the number of mols of glycol used.

It is obvious that the organosilicon compound must be one which will react with the glycol. Such compounds are embraced by the general formula

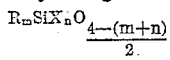

where R is an alkyl radical of not more than ten carbon atoms and/or a phenyl radical; X is selected from an alkoxy radical, a halogen or OH; $m$ has an average value of 1 to 2; $n$ has an average value of 0.01 to 3; and the sum of $(m+n)$ is not greater than four. The formula embraces silanols, alkyl or aryl halosilanes, and alkoxy or aryl siloxanes, as well as alkoxy or phenoxy siloxanols, including both monomeric and polymeric compounds. In addition, it is obvious that aryl or alkyl alkoxy silanes, which readily hydrolyze to form silanols, are within the scope of this invention.

Silanols, halosilanes, siloxanes and siloxanols contemplated by this invention are known materials whose functionalities vary from one functional group per hundred silicone atoms, to three functional groups per silicone atom. A particularly desirable organosilicon compound is formed when, in the preceding formula, $n$ equals one, $m$ equals 5/3, X is a methoxy radical, and R represents phenyl and methyl radicals, thus forming dimethyl-triphenyltrimethoxytrisiloxane,

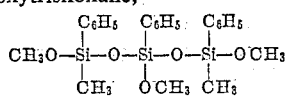

commercially available as "Sylkyd 50." This methoxy siloxane and other alkoxy siloxanes react with glycols by replacement of their alkoxy groups. The silanols and siloxanols react by replacement of their hydroxyl groups. In the former case, an alcohol is formed; in the latter, water results. Other desirable siloxanes are diethyl tetramethyl disiloxane $$[C_2H_5O((CH_3)_2SiO)_2C_2H_5)]$$

diethoxyhexamethyl trisiloxane $$[C_2H_5O((CH_2)_2SiO)_3C_2H_5]$$

diethoxyoctamethyl tetrasiloxane $$[C_2H_5O((CH_3)_2SiO)_4C_2H_5]$$

diethoxydecamethyl pentasiloxane $$[C_2H_5O((CH_3)_2SiO)_5C_2H_5]$$

diethoxydodecamethyl hexasiloxane $$[C_2H_5O((CH_3)_2SiO)_6C_2H_5]$$

tetraethoxy dimethyl disiloxane $$[C_2H_5O(Si(CH_3)OC_2H_5O)_2C_2H_5]$$

Thus, in an important aspect, the invention contemplates polyorganosiloxane having the average formula

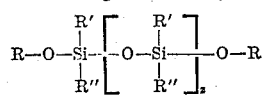

wherein R is an alkyl radical containing from one to four carbon atoms, R' and R" are each selected from the group consisting of alkyl and aryl radicals, and $z$ is at least one. It is understood, however, that ring structures are also within the above formula as well as linear siloxanes. Thus, in

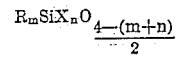

when $m$ is one, and $n$ is 4/6, a compound of the following structure is included wherein $z$ is at least one.

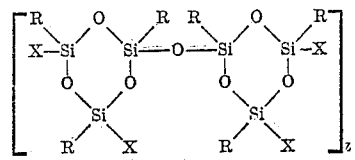

Examples of other siloxanes are pentaethyl methoxy disiloxane, octachloro cyclo trisiloxane, and such siloxanols as tetraphenyl disiloxanediol, tetraethyl disiloxanediol, tetramethyl dimethylol siloxane, etc.

It is noted that when the sum of $(m+n)$ equals four, in

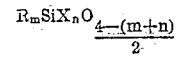

the O drops out of the formula and alkoxy silanes, halosilanes or silanols are indicated. Among the silanols which are employed in accordance with this invention are triethyl silanol [$(C_2H_5)_3SiOH$], methyl dichloro silanol, diethyl bromo silanol, ethyl dimethoxy silanol, ethyl dibutoxy silanol, diphenyl chloro silanol, benzyl diethoxy silanol, triphenyl silanol, diethyl benzyl silanol, and the like.

Glycols which provide one hydroxyl for reaction with the organosilicon compound and one for reaction with a dicarboxylic acid anhydride or epoxide group are either dihydric alcohols or dihydric ether alcohols, that is, polyoxyalkylene glycols. Thus, by glycol is meant a dihydric alcohol containing only carbon, hydrogen and oxygen and free from oxygen-containing groups other than ether oxygen and hydroxyl groups. Suitable glycols are those having molecular weights not exceeding about 800, for example, 2-ethylhexanediol-1,3, ethylene glycol, 2-ethylhexanediol, propylene glycol, dimethylene glycol, diethylene glycol, dipropylene glycol, and polyoxyethylene glycols having molecular weights of 200, 300, 400, etc.

Dibasic acids forming the carboxyl portion of the carboxy-organosilicon molecule are saturated or unsaturated dicarboxylic acids, the anhydride, as indicated, being preferred, so that there is no water formation and so that temperatures sufficiently low can be employed to preclude carboxy-hydroxy cross-linking. The dicarboxylic acids are succinic, adipic, maleic, fumaric, itaconic, citraconic, mesaconic, orthophthalic, isophthalic, terephthalic, as well as endo-cis-bicyclo-(2,2,1)-5-heptene-2,3-dicarboxylic anhydride (sold under the trademark "Nadic" anhydride), 1,4,5,6,7,7-hexachlorobicyclo-(2,2,1)-5-heptene-2,3-dicarboxylic anhydride (sold under the trademark "Chlorendic" anhydride), tetrahydrophthalic acid anhydride and hexahydrophthalic acid anhydride.

In the preparation of the carboxy-organosilicon compound it is preferred to react the particular organosilicon compound with the glycol to form the hydroxyl-substituted intermediate. The hydroxyl-substituted intermediate is then reacted with the dibasic acid or anhydride to form the carboxy-containing organosilicon compound. When the organosilicon compound is an alkoxy compund such as the alkoxy silane or siloxane, the glycol-organosilicon compound reaction is carried out at a temperature high enough to remove the alcohol formed from the alkoxy group. It should be noted, however, that if the temperature is too high the glycol will form an azeotrope with the alcohol formed by the reaction and the glycol will be lost. Accordingly, the maximum temperature generally should be the boiling point of the alcohol formed. After reaction of the glycol-organosilicon compound, the product is usually slightly cooled and an anhydride is added. While it may be necessary with some anhydrides to heat the mixture at a temperature sufficient to melt the anhydride, the reaction is exothermic and usually supplies sufficient heat to effect the reaction.

To form the resinous composition of this invention, the resulting carboxy-containing organosilicon compound and the epoxy ester-vinyl copolymer are mixed or blended to form a composition which can be subsequently heat cured to form a cross-linked, infusible, insoluble composition. The mixture or blend advantageously forms a stable composition which makes it particularly useful industrially. Curing is generally effected by heating the blend to a temperature of 150–200° C. While any of the known carboxy-epoxy catalysts such as amines, amine salts, quaternary amonium hydroxides and quaternary ammonium salts can be used, a catalyst is not necessary and, in fact, color retention is better when curing takes place in the absence of a catalyst. It is understood, however, that when the rate of reaction is more important than the color, then a catalyst is used.

As indicated, at least two mols of glycol are reacted with the initial organosilicon compound to form the glycol-organosilicon compound, and usually the number of mols of glycol is equal to the functionality of the initial organosilicon compound. In other words, the number of mols of glycol is equal to the number of functional groups, for example, alkoxy groups, which the glycol will replace. Thus, in the case of dimethyl triphenyltrimethoxytrisiloxane, three mols of glycol are used because the organo-silicon molecule contains three replaceable methoxy groups. The resulting glycol-organosilicon compound is then reacted with the dibasic acid anhydride. The anhydride can be used in any amount of from one mol up to the number of mols of the glycol used. In many instances, however, two mols of acid anhydride are sufficient, since due to stearic hindrance and similar factors, it is difficult to get more than two mols of acid, or anhydride, to react with the glycol-organosilicon compound.

In the preparation of the resinous composition of the invention, that is, the blend of carboxy-organosilicon compound and epoxy-containing vinyl copolymer, it is desirable to blend such ratios as to have one carboxyl of the carboxy-organosilicon compound per epoxide group of the epoxy-containing vinyl copolymer. It may be desirable in some instance, however, to employ a slight excess of epoxy-containing vinyl copolymer, say, ten to fifty percent, since some epoxy-hydroxy reaction may occur, to consume some of the epoxide groups. While results will not be comparable in all respects, satisfactory finishes can be obtained by using other ratios, for example, from 0.5 to 1.2 carboxyl groups of carboxy-organosilicon compound per epoxide group of the epoxy-containing vinyl copolymer.

In making coating compositions the resins are advantageously dissolved in a common solvent either without or with pigments and catalysts and after the coating composition is applied the solvent is evaporated off and the coating heated to a high tempearture to bring about reaction between the resins and the formation of the hardened coating. Suitable solvents for this purpose are ketones, esters and ethers. It will be appreciated, of course, that these solvents should be non-reactive with an epoxide or an anhydride; in other words, they should be free of hydroxyl and carboxyl groups. It will also be appreciated that solubility will differ with various members of this group. Desirable solvents are ketones, for example, acetone, methyl ethyl ketone, methyl isobutyl ketone, diisobutyl ketone, etc., and "Cellosolve" derivatives such as "Cellosolve acetate" (2-ethoxyethanol acetate), the diethyl ether of ethylene glycol, and mixtures of ketones or "Cellosolve" derivatives with aromatic hydrocarbons such as xylene, toluene, benzene, etc. For molding mixtures the resins can be admixed in liquid form or in solid form or in solution and with or without catalysts such as small amounts of alkali or alkali phenylates or amines, filling and compounding materials, etc.

The preparation of the glycidyl copolymer, the carboxy-organosilicon compound and films from the combination of the two can best be illustrated by the following examples. In the examples, all parts given are on a weight basis, i.e., parts by weight. It is understood that the examples are illustrative only since castings, pottings, laminates and the like can be made as well as films.

*Example 1*

In a flask provided with an agitator, a reflux condenser and a dropping funnel, 1636 parts of xylene are heated to reflux at a temperature of about 276° F. Two hundred parts of a commercially available sample of glycidyl methacrylate, six hundred parts of methyl methacrylate and twelve hundred parts of styrene are premixed with thirty parts of ditertiary butyl peroxide and this monomer-catalyst mixture is added through the droping funnel to the refluxing solvent at the refluxing temperature. Refluxing conditions are maintained, the mixture is continuously stirred, and the reaction is permitted to proceed to completion at the reflux temperature of about 276° F., to form a sixty percent styrene/thirty percent methyl methacrylate/ten percent glycidyl methacrylate copolymer. The progress of the reaction is determined by viscosity measurements made on samples periodically during the course of the reaction by diluting to a theoretical fifty percent solids with xylene, the reaction being considered complete when the viscosity remains constant, in this case at about W–X (Gardner-Holdt). The final copolymer, having a weight per epoxide of 1394, is adjusted to a theoretical fifty percent solids solution by the addition of 364 parts of xylene, is cooled and filtered, the resulting fifty percent solids solution having a viscosity of W–X (Gardner-Holdt), an acid value of less than one, and a color of less than one.

*Example 2*

A sixty percent styrene/thirty percent methyl methacrylate/ten percent glycidyl methacrylate is produced in accordance with Example 1, the only change being that the theoretical weight per epoxide of the copolymer was 1420.

*Example 3*

In a flask provided with an agitator, a reflux condenser and a dropping funnel, 450 parts of xylene and 286 parts of 2-ethoxyethanol acetate are heated to reflux at a temperature of 288° F. Ninety parts of glycidyl methacrylate and 810 parts of styrene are premixed with 13.5 parts of a ditertiary butyl peroxide catalyst, and this monomer-catalyst mixture is added to the refluxing solvent at the refluxing temperature. Refluxing conditions are maintained, the mixture is continuously stirred, and the reaction is permitted to proceed to completion at the reflux temperature of about 288° F., the progress of the reaction being determined by viscosity measurements made on samples periodically during the course of the reaction at a theoretical fifty percent solids by dilution with xylene. The reaction is considered complete when the viscosity remains constant, at about U–V (Gardner-Holdt). The final copolymer having a theoretical weight per epoxide of 1420, is adjusted to a theoretical fifty percent solids solution by the addition of 450 parts of xylene, is cooled and filtered.

*Example 4*

In a flask provided with a side arm condenser and an agitator, 1260 parts of dimethyltriphenyltrimethoxytrisiloxane and 496 parts of ethylene glycol, while being continuously stirred, are heated to a temperature of about 350° F. to distill off the theoretical amount of methanol formed by the reaction (256 parts). Caution is exercised to keep the reaction temperature below 380° F. at all times to prevent formation of a methanol-ethylene glycol azeotrope. When the theoretical amount of methanol has been distilled off, the product is cooled to about 300° F. and 789 parts of phthalic anhydride are added. A temperature of 250° F. to 280° F. is maintained for about fifteen minutes, until the phthalic anhydride is melted, and a clear solution is obtained. The resulting product is a dicarboxy-organosilicon compound formed by the addition of three mols of glycol to one mol of dimethyltriphenyltrimethoxytrisiloxane and the addition of two mols of anhydride to two of the glycol hydroxyls. The product is thinned to about seventy per cent solids by the addition of 960 parts of 2-ethoxyethanol acetate and held at 250° F. for fifteen more minutes. The resulting product is then thinned to sixty-five percent solids by the addition of 1329 parts of 2-ethoxyethanol acetate and filtered. The filtered sixty-five percent solids solution has a viscosity of A, an acid value of 131, the theoretical yield being 2289 parts.

*Example 5*

In a flask provided with an agitator and a side arm condenser, 1260 parts of dimethyltriphenyltrimethoxytrisiloxane and 496 parts of ethylene glycol, while being continuously stirred, are heated to 300° F., the methanol formed by the reaction being allowed to distill over into the side arm. The distillation is continued until the theoretical amount of methanol (256 parts) is distilled off and the viscosity is about W-X at one hundred percent solids, caution being exercised to insure that temperature does not reach 380° F., thereby preventing the formation of a methanol-ethylene glycol azeotrope. The product is then cooled to below 300° F. and 875 parts of endo-cis-bicyclo (2,2,1)-5-heptene-2,3-dicarboxylic anhydride are added. A temperature of 250° F. to 280° F. is maintained for approximately fifteen minutes, during which time the anhydride melts and a clear solution is obtained. The resulting product is thinned to about seventy percent solids by the addition of 960 parts of 2-ethoxyethanol acetate and held at 250° F. for fifteen minutes. The resulting product is then thinned to fifty percent solids by the addition of an additional 1329 parts of 2-ethoxyethanol acetate and filtered. The filtered solution has a viscosity of $A_4$–$A_5$, an acid value of 127, the theoretical yield being 2289.

*Example 6*

Following the procedure of Example 5, 1260 parts of dimethyltriphenyltrimethoxytrisiloxane and 496 parts of ethylene glycol are reacted, 533 parts of succinic acid anhydride being subsequently added and reacted as set forth in Example 5. A fifty percent solids solution in 2-ethoxyethanol acetate, of the resulting disuccinic acid half ester of the triglycol adduct of Sylkyd 50 has an acid value of 145, the theoretical acid value being 147, and a weight per carboxyl group of 381.7, the theoretical yield being 2033.

*Example 7*

To prepare films, 76.8 parts of the glycidyl copolymer of Example 2 and 23.2 parts of the carboxy-organosilicon compound of Example 4, each at fifty percent solids, are blended and 11.1 grams of 2-ethoxyethanol acetate are added to form a forty-five percent solids solution. The blend forms a clear solution having a Gardner-Holdt viscosity of K at three days, L at seven days, N at nineteen days and P at thirty-nine days. Using a 0.003 inch blade, a film of the blend is drawn down on a glass panel and baked for twenty minutes at 375° F. A clear, flexible film results having good mar resistance, a pencil hardness of 3–H. For comparison, 23.2 parts of 1,4,-5,6,7,7-hexachlorobicyclo-(2,2,1)-5-heptene - 2,3 - dicarboxylic anhydride (sold under the trademark HET anhydride) are substituted for the 23.2 parts of the carboxy-organosilicon compound of Example 4 and a forty-five percent solids solution is prepared. A film made from this blend at 375° F. does not have the flexibility and resistance properties of organosilicon-formed films of this invention.

*Example 8*

To prepare films, 76.2 parts of the glycidyl copolymer of Example 2 and 23.8 parts of the carboxy-organosilicon compound of Example 5, each at fifty percent solids, are blended and 11.1 grams of 2-ethoxyethanol acetate are added to form a forty-five percent solids solution. The blend forms a clear solution having a viscosity (Gardner-Holdt) of K at three days, K–L at seven days, L–M at nineteen days and L–M at thirty-nine days. Using a 0.003 inch blade, a film of the blend is drawn down on glass and baked for twenty minutes at 375° F. A clear, tough film results having a pencil hardness of 3–H.

*Example 9*

To prepare films, 76.8 parts of the glycidyl copolymer of Example 1 and 23.2 parts of the carboxy-organosilicon compound of Example 4, each at fifty percent solids, are blended and 11.1 grams of 2-ethoxyethanol acetate are added to form a forty-five percent solids solution having a viscosity of L (Gardner-Holdt) and an acid number of 31.2. Using a 0.003 inch blade, a film is drawn down on glass and baked for twenty minutes at 375° F. A clear, tought film results having a pencil hardness of 3–H.

*Example 10*

To prepare films, 78.8 parts of the glycidyl copolymer of Example 2 and 21.2 parts of the carboxy-organosilicon compound of Example 6, each at fifty percent solids, are blended and 11.1 grams of 2-ethoxyethanol acetate are added to form a forty-five percent solids clear solution. Using a 0.003 inch blade, a film is drawn down on glass and baked for twenty-minutes at 375° F. A good tough, clear film results having a pencil hardness of 3–H.

*Example 11*

To prepare films, 76.8 parts of the glycidyl copolymer of Example 3 and 23.2 parts of the carboxy-organosilicon compound of Example 4, each at fifty percent solids, are blended and 11.1 grams of 2-ethoxyethanol acetate are added to form a forty-five percent solids clear solution. Using a 0.003 inch blade, a film is drawn down on glass and baked for twenty minutes at 375° F. A good tough, clear film results.

In protective coating applications, a composition of suitable viscosity is obtained usually through the use of a solvent such as methyl ethyl ketone, methyl isobutyl ketone, acetone and other ketones; ethyl acetate, butyl acetate, "Cellosolve" acetate (ethylene glycol monoacetate) and other esters; and chlorinated hydrocarbons such as trichloropropane.

Besides clear films, valuable enamels are obtained by pigmenting the compositions with the usual type of inert pigments used in the formulation of enamels and paints, care being taken not to use pigments which are affected by acidic conditions. In fact, pigmented film-forming compositions constitute a particularly important aspect of this invention because of the outstanding overbake properties of the clear and pigmented films of this invention. There is little evidence of yellowing and dulling when these cured films are subjected even to extreme heat. By overbake is meant subjecting the composition or film to further heat after optimum properties are obtained by the heat-curing or thermosetting of the compounds. Since enamels prepared in accordance with this invention do not yellow on aging and overbaking, film compositions of this invention are eminently suitable for coating washing machines, driers, ironers, ranges and similar appliances.

Enamels prepared in accordance with the invention are very useful on appliances also because of their stain resistance and their resistance to ultra-violet light. Characteristics of these films are best illustrated by the following results of the testing of an enamel prepared from the glycidyl copolymer-carboxy-organosilicon compound of Example 9, comprising the glycidyl copolymer of Example 1 and the carboxy-organosilicon compound of Example 4.

The enamel of this invention, hereinafter referred to as JD enamel, is made in two steps: first, the grinding or dispersing of the pigment with a portion of the vehicle blend and solvent in a pebble mill, and second, the change of the pebble mill base into an enamel by the addition of more resin and solvent with agitation.

PEBBLE MILL BASE

| | Parts by weight |
|---|---|
| Rutile titanium dioxide | 23.50 |
| Composition of Example 9 | 5.20 |
| Methyl isobutyl ketone | 5.00 |
| Ethylene glycol monoacetate | 5.00 |
| Grind in a pebble mill eighteen hours and add | |
| Composition of Example 9 | 15.00 |
| | 53.70 |

Grind in a pebble mill two hours and empty

JD ENAMEL

| | |
|---|---|
| Pebble mill base | 53.70 |
| Composition of Example 9 | 45.20 |
| Additive for better mar resistance (Dow Silicone Oil DC200, 100CS) | .08 |
| Ethylene glycol monoacetate | 1.02 |
| | 100.00 |

The excellent overbake properties of the resulting white enamel are compared with alkyd enamels, one including an alkyd-urea formaldehyde binder and another including an alkyd-melamine binder such as are normally used in enamels instead of the organosilicon binder of this invention. Cured films of each enamel on cold rolled steel panels (Bonderite 1000) are subjected to overbaking temperatures of 400° F. for thirty minutes, one hour and sixteen hours with the following results.

COLOR CHANGE EXPRESSED IN JUDD UNITS

| Overbake conditions | JD enamel | Alkyd-U.F. | Alkyd-melamine |
|---|---|---|---|
| 30' at 400° F | 0.60 | 8.16 | 2.60 |
| 60' at 400° F | 0.96 | | |
| 16 hours at 400° F | 2.68 | | |

GLOSS

| | JD enamel | Alkyd-U.F. | Alkyd-melamine |
|---|---|---|---|
| Original gloss degrees | 91 | 92 | 94 |
| 30' at 400° F overbake do | 90 | 59 | 80 |
| 16 hours at 400° F do | 85 | | |

The foregoing color retention and gloss measurements show that the color and gloss changes in the enamel of this invention at the end of sixteen hours overbake compare with the alkyd-melamine-based enamel at the end of thirty minutes. Color and gloss characteristics are also far superior to alkyd-urea formaldehyde-based enamels. The color change is determined using a Color Eye ® (Model C), described in such periodicals as Electronics, and Instruments. A color is viewed by the Color Eye through three filters and three reflectances are read and are converted to ICI units (International Committee on Illumination) of measurement. The ICI units of measurement before and after overbake are then converted into the Judd Unit of Color Difference. Thus, the enamel of this invention on overbake underwent a color change of 2.68 Judd units in sixteen hours. The sixteen hour color change of the other two films was not determined because of the great visible color change in these two alkyd films. At the end of sixteen hours, the two panels coated with the alkyd enamel were tan, whereas the panel coated with the JD enamel, at the end of sixteen hours overbake, was only slightly cream colored, that is, not as white as it was before it was overbaked.

The gloss was recorded with a 60° photovolt glossmeter. The change in gloss of the JD enamel was not as great in sixteen hours overbake as was the change in gloss of the alkyd enamels in thirty minutes overbake.

The remarkable overbake properties of the enamel of this invention are particularly noteworthy in view of the fact that enamels made from glycidyl polyethers, the so-called ethoxyline or epoxide resins, do not exhibit these outstanding overbake properties. When 0.003 inch films of the vehicle of this invention are drawn down on Vitrolite panels baked for thirty minutes at 375° F. and then overbaked, first for sixteen hours at 300° F. and then an additional sixteen hours at 400° F., changes in color due to overbaking are about 17 Judd units as determined on a Hunter-Color Difference Meter. Color changes due to overbaking similarly cured and subsequently similarly overbaked films made from dimethyltriphenyltrimethoxytrisiloxane, dihydric alcohols, and dibasic acids, but using bisphenol-epichlorhydrin epoxides instead of the epoxy-containing copolymer of this invention, are about 64 Judd units. While the particular color differences, as expressed in Judd units, will vary somewhat depending upon variations in samples and operational factors, color changes of overbaked films of this invention, and overbaked films using an epoxide resin in lieu of the glycidyl copolymer of the invention, will generally be in about the ratio of 17 to 64 Judd units.

As indicated hereinbefore, the film-forming compositions of this invention are especially desirable for appliances because of their hardness and resistance to grease stains, detergents, water and the like. The hardness, stain resistance, and other properties of this invention are best illustrated by the following tables. In the tables are tabulated results of typical tests to which enamels of this type are subjected. The tabulated data are tests of films obtained by spraying the JD enamel on rolled steel panels. (The steel panels were phosphatized with Bonderite 1000.) In each of the two following tables, results are given for three types of film applications, a one-coat application, the JD enamel over a flash primer, and the enamel of the invention over a baked-on primer. The primer in each case is a commercial "Devran" (trademark) White Primer which includes an epoxide or ethoxyline resin solution and a polybasic acid anhydride curing agent.

Films, the tests of which are given in the following tables, were prepared as follows. The JD one coat enamel film was prepared by spraying the enamel onto the Bonderite panel to form a 1.5 to 2.0 mil film, and baking the film thirty minutes at 375° F. In applying the JD enamel, over the flash primer, the primer is sprayed onto the bonderite panel forming a 0.5 mil film, a two to three minute period at room temperature is allowed for flashing off the solvent, after which the film is top coated with the JD enamel forming a 1.0 to 1.5 mil film which is baked for thirty minutes at 375° F. In using the JD enamel over the white baked on primer, or bake primer, a 0.7 to 1.0 mil sprayed film of the primer is baked for thirty minutes at 375° F. The primer is then sprayed with JD enamel to form a 1.0 to 1.2 mil film which is subsequently baked thirty minutes at 375° F. The film properties and resistance properties of these films are given in the following two tables.

FILM PROPERTIES

| Test | One coat JD Enamel | JD Enamel over flash primer | JD Enamel over bake primer |
|---|---|---|---|
| Pencil hardness | 5H | 5H | 5H. |
| Impact [1] 30 in. lb.: | | | |
| Convex | Radial cracking and flaking | Fine radial cracks, no flaking | Fine radial cracks, no flaking. |
| Concave | Concentric cracking and flaking | Fine concentric cracks, no flaking | Fine concentric cracks, no flaking. |
| Zuhr conical mandrel [2] | Cracking and flaking width of panel | Fine cracks, no flaking | Fine cracks, no flaking. |
| Overbake, 16 hrs. at 400° F | 2.72 Judd units (change) | 7.00 Judd units | 9.12 Judd units. |
| Gloss (photovolt 60° glossmeter) [3] | 90°–95° | 90°–95° | 90°–95°. |
| Taber abrasion [4] CS10, 1,000 gm. wheels. | 63.3 mg. loss/1,000 rev | 70.4 mg. loss/1,000 rev | 75 mg. loss/1,000 rev. |

[1] Physical and Chemical Examination, Gardner, p. 188A, Fig. 287C.
[2] ASTM d 522–41, ASTM Standards 1955, part 4, p. 408.
[3] Federal Specifications Book TT-P-141b, Jan. 15, 1949, Method 610.1.
[4] Physical and Chemical Examination, Gardner, p. 185, Fig. 280.

RESISTANCE PROPERTIES

| Test | One coat JD Enamel | JD Enamel over flash primer | JD Enamel over bake primer |
|---|---|---|---|
| Salt spray, 2,715 hours 20 percent NaCl solution at 96° F. | 1/16″–1/4″ creepage | 1/16″ creepage | 1/64″–3/64″ creepage. |
| Water soak 120° F, 3,000 hours | No blistering, loss of adhesion or gloss; slight yellowing. | No blistering, loss of adhesion or gloss; slight yellowing. | No blistering, loss of adhesion or gloss; slight yellowing. |
| Humidity, 100 percent at 105° F., 3,500 hours. | do | No blistering | Do. |
| Tide, 1 percent at 160° F., 200 hours. | Isolated to scattered small blisters | Isolated to scattered small blisters | Isolated pinpoint to small blisters. |
| Weatherometer [1] (600 hours) | No checking, chalking, blistering, or loss of gloss, slight yellowing. | No checking, chalking, blistering, or loss of gloss, slight yellowing. | No checking, chalking, blistering, or loss of gloss, slight yellowing. |
| Florida exposure at 45° F. 6 months. | No checking, chalking or blistering, very slight dulling and yellowing. | No checking, chalking or blistering, very slight dulling and yellowing. | |
| Grease,[2] 9 weeks | Softens from 5H to 3H pencil hardness. | Softens from 5H to 3H pencil hardness. | Softens from 5H to 3H pencil hardness. |

[1] ASTM e 42–42T, ASTM Standards 1942, part 2, p. 1432.
[2] 50/50 oleic acid-cottonseed oil.

The foregoing test results show the outstanding properties of films prepared in accordance with this invention. The films of the invention are not only resistant to detergents, but are highly resistant to stain-causing household materials such as mustard, lipstick, catsup, orange juice, vinegar, chlorox, merthiolate, five percent sodium hydroxide, etc. The composition of this invention form hard films and are particularly useful in the formation of appliance paints and enamels by pigmentation because of their color and gloss retention on overbake. In addition, enamels of this invention are highly resistant to exposure to ultra-violet light. Enamels made according to this invention are superior to enamels now used in the major appliance field. They will also find utility in other appliance applications where baked-on enamels having good gloss and color retention and chemical resistance are required.

It has been stressed that while the principles of this invention have particular application to films, castings and pottings can be made. Such modifications are within the skill of the art, and other variations will occur to those having before them the teachings of this invention. For example, adhesives and laminates are within the contemplation of this invention and products can be prepared having a range of physical properties rendering them suitable for decorative, industrial and maintenance finishes, plastic articles, and the like. Plasticizers, pigments, dyes, reinforcing agents, and similar materials commonly used in the preparation of plastic articles can be used with the complex compounds of this invention. Since such variations will occur to those skilled in the art, these embodiments are within the scope of the invention.

What is claimed is:

1. A resinous reaction product formed by heat curing (a) an epoxy-containing copolymer of an unsaturated glycidyl ester and a vinylidene compound copolymerizable therewith, and (b) a carboxy-containing organosilicon compound formed by replacing, with a hydroxy-carboxy ester of a glycol and a dicarboxylic acid, from two to all of the functional groups of an organosilicon compound which is at least difunctional and is selected from the group consisting of silanols, halosilanes, alkoxysilanes, siloxanols, halosiloxanes, and alkoxysiloxanes, wherein (a) and (b) are present in an amount of 0.5 to 1.2 carboxy groups of (b) per epoxide group of (a).

2. A metallic appliance having a surface provided with, as a coating, the resinous reaction product of claim 1.

3. A composition of matter comprising (a) an epoxy-containing vinyl copolymer of a glycidyl ester represented by the general formula

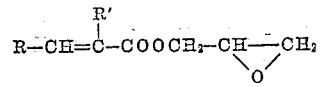

where R and R' each represents a member of the class consisting of hydrogen and the methyl radical, and a compound copolymerizable therewith having a $CH_2=C<$ group; and (b) a carboxy-containing organosilicon compound formed by replacing, with a hydroxy-carboxy ester of a glycol and a dicarboxylic acid, from two to all of the functional groups of an organosilicon compound which is at least difunctional and is selected from the group consisting of silanols, halosilanes, alkoxysilanes, siloxanols, halosiloxanes, and alkoxysiloxanes, wherein (a) and (b) are present in an amount of one carboxy group of (b) per epoxide group of (a).

4. A clear coating composition comprising a solvent and, as a film-forming material in solution therein, the composition of claim 3.

5. A pigmented coating composition comprising a pigment, a solvent, and, as a film-forming material in solution therein, the composition of claim 3.

6. A composition of matter comprising (a) a glycidyl acrylate vinyl toluene copolymer and (b) a carboxy-containing organosilicon compound formed by replacing, with a hydroxy-carboxy ester of a glycol and a dicarboxylic acid, from two to all of the functional groups of an organosilicon compound having the following average structure.

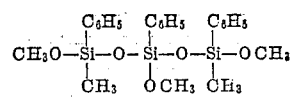

wherein (a) and (b) are present in an amount of one carboxyl group of (b) per epoxide group of (a).

7. A composition of matter comprising (a) a glycidyl methacrylate-styrene copolymer and (b) a carboxy-containing organosilicon compound formed by replacing, with a hydroxy-carboxy ester of a glycol and a dicarboxylic acid, from two to all of the functional groups of an organosilicon compound having the following average structure.

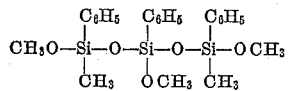

wherein (a) and (b) are present in an amount of one carboxyl group of (b) per epoxide group of (a).

References Cited in the file of this patent

UNITED STATES PATENTS

| | | |
|---|---|---|
| 2,524,432 | Dorough | Oct. 3, 1950 |
| 2,687,398 | McLean | Aug. 24, 1954 |
| 2,843,560 | Mika | July 15, 1958 |